(12) United States Patent
Sun et al.

(10) Patent No.: US 6,917,031 B1
(45) Date of Patent: Jul. 12, 2005

(54) METHOD FOR QUADRATURE PHASE ANGLE CORRECTION IN A COHERENT RECEIVER OF A DUAL-POLARIZATION OPTICAL TRANSPORT SYSTEM

(75) Inventors: Han Sun, Nepean (CA); Kuang Tsan Wu, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/778,026

(22) Filed: Feb. 17, 2004

(51) Int. Cl.[7] .............................................. H01J 40/14
(52) U.S. Cl. .............................. 250/214 R; 250/214 C; 250/225; 332/103; 342/194
(58) Field of Search ........................ 250/214 R, 214 C, 250/214 DC, 225; 332/103, 144; 342/151, 152, 194; 375/226, 235, 329; 455/67.16, 139; 385/12

(56) References Cited

U.S. PATENT DOCUMENTS

2004/0121741 A1 * 6/2004 Rashev et al. ........... 455/114.3

OTHER PUBLICATIONS

"Secure Optical Communications Utilizing PSK Modulation, Polarization Multiplexing and Coherent Digital Homodyne Detection with Wavelength and Polarization Agility", A. Salamon, G. Levy–Yurista, M. Tseytlin, P.S. Cho, and I. Schpantzer, Celight Inc., http://www.celight.com/images/pdfs/Polarization_Presentation_OFC_2003.pdf.

"Digital, endless polarization control for polarization multiplexed fiber–optic communications", M. Tseytlin, O. Ritterbush, J. Schwarzwalder, and A. Salamon, Celight Inc., 2003, http://www.celight.com/images/pdfs/Celight_Coherent_Communications.pdf.

* cited by examiner

Primary Examiner—Kevin Pyo
(74) Attorney, Agent, or Firm—Jeffrey M. Measures; Borden Ladner Gervais LLP

(57) ABSTRACT

A method is provided for correcting a quadrature angle error that exists in the coherent receiver hardware of a dual-polarization optical transport system. The receiver hardware that causes the quadrature angle error is a 90 degree optical hybrid mixing device. The method involves generating an estimate of the quadrature angle error and compensating for the quadrature angle error by multiplying the first and second detected baseband signals by coefficients that are a function of the estimate of the quadrature angle error. The method is robust to severe channel distortion encountered within an optical fiber transmission channel as well as temperature effects and ageing of the 90 degree optical hybrid. The method is suited for a digital signal processing implementation in the coherent receiver when a modulation scheme used on a transmitted signal is quadriphase-shift keying (QPSK). In other embodiments, the method can be used to correct for quadrature angle error in modulation schemes such as binary PSK, M-ary PSK where M>4, or Quadrature Amplitude Modulation (QAM). The method can be implemented by an application-specific integrated circuit (ASIC).

21 Claims, 3 Drawing Sheets

METHOD FOR QUADRATURE PHASE ANGLE CORRECTION IN A COHERENT RECEIVER OF A DUAL-POLARIZATION OPTICAL TRANSPORT SYSTEM

FIELD OF THE INVENTION

The invention relates to correction of a quadrature angle error occurring between signals modulated using an in-phase and quadrature carrier or M-ary modulation scheme within a coherent receiver of an optical transport system.

BACKGROUND OF THE INVENTION

DWDM optical communications systems reached the level of being able to successfully transmit and receive 10 Gbits/s per wavelength channel in the late 1990's. In continuing to strive for even greater capacity designers of optical communication systems have had to become inventive about how to increase the spectral efficiency. There are a limited number of channels that can be used in the well-known C-band (1530 nm to 1560 nm) and L-band (1560 nm to 1610 nm) wavelength ranges. As more channels are packed into the useable wavelength range of the optical communications spectrum the constraints of optical components in the communication system need to become more stringent. Laser transmitters and optical bandpass filters need tighter controls and thus become more expensive to produce. Achieving higher transmission rates using more channels also means that additional infrastructure may be required if attempting to use a pre-existing optical network.

A physical property of light is that it can exist in two distinct linear polarization states. The two linear polarization states are orthogonal with respect to each other. Taking advantage of this property a single wavelength can be used to carry two signals, a first signal being modulated on a first linear polarization state and a second signal being modulated on a second linear polarization state, which is orthogonal to the first linear polarization state.

Quadrature carrier modulation has been used extensively in radio frequency communication systems for many years. By modulating a portion of a signal with a local oscillator (LO) and modulating another portion of the signal with the same LO 90 degrees out of phase, it is possible to double the transmission spectral efficiency while using the same frequency band.

Taking advantage of the dual-polarization property of light and quadrature carrier modulation it is possible to achieve a four fold improvement in transmission efficiency while using the same frequency band. As a result, conventional 10 Gbit/sec long haul and ultra-long haul communication networks are capable of achieving 40 Gbits/sec without the extra monetary expense caused by tighter specifications on the optical components of the communication system or significant upgrades to existing infrastructure.

With the four fold improvement in transmission efficiency also comes increased difficulty in recovering transmitted signals at a receiver of a quadrature carrier dual-polarization optical communication system.

An optical fiber transmission channel introduces various forms of signal degradation that make it difficult to recover an original transmitted signal. Chromatic dispersion, polarization rotation, polarization mode dispersion (PMD) and polarization dependent loss (PDL) are typical factors that degrade the transmitted signal.

The transmitter and receiver components in the quadrature carrier dual-polarization optical communication system also introduce further signal degradation. Factors such as bandwidth limiting effects caused by inter-symbol-interference (ISI), imperfections in transmitter and receiver hardware, and phase noise generated by the transmitter laser and the receiver LO laser all degrade the transmitted signal.

In a quadrature carrier modulation scheme if two signals are not orthogonal to each other then there exists a phase angle error that causes signal interference to occur between the two signals making it impossible to recover either signal accurately. The phase angle error is commonly referred to as a quadrature angle error.

Quadrature orthogonality of received signals in the quadrature carrier dual-polarization optical communication system can be disrupted by imperfections in the transmitter hardware and the receiver hardware.

SUMMARY OF THE INVENTION

A method is provided for correcting a quadrature angle error that exists in the coherent receiver hardware of a dual-polarization optical transport system. The method can be implemented for both polarization components of the dual-polarization optical transport system. The quadrature angle error in the receiver hardware is typically caused by a 90 degree optical hybrid mixing device.

An initial step in the method involves generating an estimate of the quadrature angle error that exists between detected in-phase and quadrature baseband signals. In a further step, the estimate of the quadrature angle error is used to calculate coefficients, which are a function of the estimate of the quadrature angle error and are used to compensate for the quadrature angle error. The coefficient are then multiplied by the detected in-phase and quadrature baseband signals to provide quadrature angle corrected in-phase and quadrature signals.

The method is robust to severe channel distortion encountered within an optical fibre transmission channel as well as temperature effects and ageing of the 90 degree optical hybrid.

The method is suited for a digital signal processing implementation in the coherent receiver. An application-specific integrated circuit (ASIC) is one form of implementation. An alternative implementation could use software.

The method can be used to correct for quadrature angle error in modulation schemes such as binary PSK, quadriphase-shift keying (QPSK), M-ary PSK where M>4, or Quadrature Amplitude Modulation (QAM).

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

A dual-polarization QPSK optical transport system consists of a transmitter, a transmission channel and a coherent receiver. The transmitter is responsible for generating a modulated optical signal, the transmission channel, which is typically a fiber optic cable, conveys the modulated optical signal to the coherent receiver, and the coherent receiver is responsible for recovering the transmitted signal using a local oscillator (LO) with a frequency that is substantially matched to a transmitter laser.

The transmitted signal from the transmitter of the dual-polarization QPSK optical transport system is comprised of first and second polarization components, wherein the first and second polarization components each comprise first and second orthogonal signals that are a result of quadrature carrier modulation. Therefore the transmitted signal is comprised of a total of four separate signals. The first orthogonal signal is commonly known as an in-phase signal and the second orthogonal signal is commonly known as a quadrature signal. The in-phase signal is generated by modulating a first baseband signal with a transmitter carrier frequency and the quadrature signal is generated by modulating a second baseband signal with the transmitter carrier frequency that is 90 degrees out of phase with respect to the transmitter carrier frequency used to modulate the in-phase signal. The transmitter uses a transmitter carrier frequency that is an optical wavelength supplied by the transmitter laser.

Figure 1:
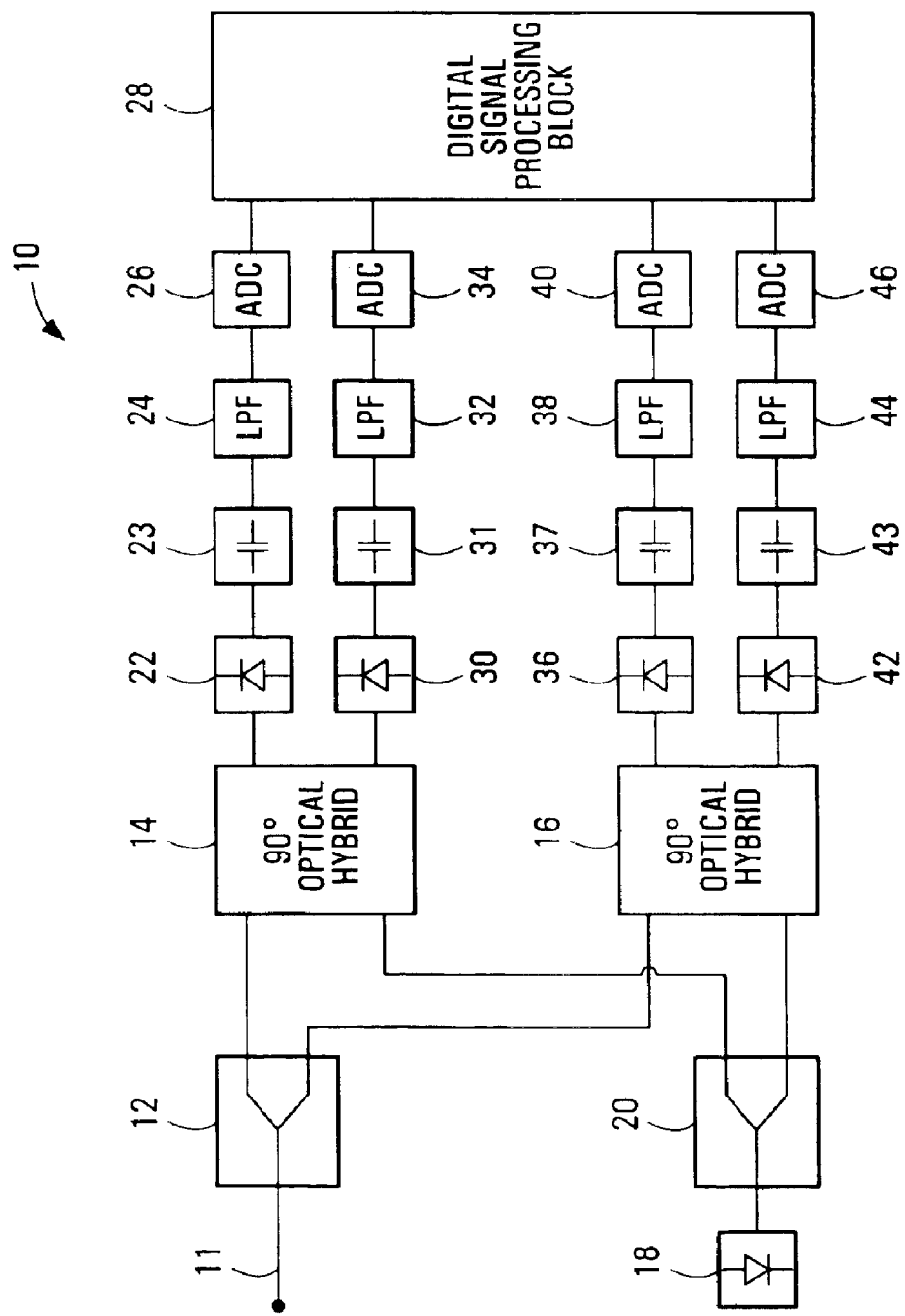
FIG. 1 is a schematic diagram of a dual-polarization QPSK receiver.

FIG. 1 shows an example of a coherent receiver used in a dual-polarization QPSK optical transport system. An input 11 to the coherent receiver is connected to a polarization beamsplitter 12. The polarization beamsplitter 12 has first and second outputs. The first output from the polarization beamsplitter 12 is connected to a first input port of a first 90 degree optical hybrid 14. The second output from the polarization beamsplitter 12 is connected to a first input port of a second 90 degree optical hybrid 16. A receiver LO laser 18 is connected to a 50/50 power splitter 20 with first and second outputs. The first output from the 50/50 power splitter 20 is connected to a second input port of the first 90 degree optical hybrid 14. The second output from the 50/50 power splitter 20 is connected to a second input port of the second 90 degree optical hybrid 16.

A first output port of the first 90 degree optical hybrid 14 is connected to a first photodetector 22. An output from the first photodetector 22 is connected to an input of a first AC coupling device 23. An output from the first AC coupling device 23 is in turn connected to an input of a first low pass filter 24. An output from the first low pass filter 24 is connected to a first analog to digital converter (ADC) 26.

The second output port of the first 90 degree optical hybrid is connected to a second photodetector 30, which is connected to a second AC coupling device 31, which is connected to a second low pass filter 32, which in turn is connected to a second ADC 34. The outputs from first and second output ports of the second 90 degree optical hybrid 16 are each connected in series to third and fourth photodetectors 36,42, third and fourth AC coupling devices 37,43, third and fourth low pass filters 38,44 and third and fourth ADCs 40,46 in the same way as the first and second outputs from the first 90 degree optical hybrid 14. The outputs from the four ADCs 26,34,40,46 are connected to a digital signal processing block 28.

In operation, the transmitted signal, comprising an in-phase signal $\tilde{I}_X$ on the first polarization component, a quadrature signal $\tilde{Q}_X$ on the first polarization component, an in-phase signal $\tilde{I}_Y$ on the second polarization component and a quadrature signal $\tilde{Q}_Y$ on the second polarization component is supplied to the coherent receiver 10 at the input 11. The polarization beamsplitter 12 serves to decompose the received signal into the first and second polarization components, which are orthogonal. The output from the polarization beamsplitter 12 has two outputs, each output containing a mixture of $\tilde{I}_X$, $\tilde{Q}_X$, $\tilde{I}_Y$ and $\tilde{Q}_Y$. The first polarization component is output from the first output of the polarization beamsplitter 12 and is supplied to the first input port of the first 90 degree optical hybrid 14. The second polarization component is output from the second output of the polarization beamsplitter 12 and is supplied to the first input port of the second 90 degree optical hybrid 16. The receiver LO laser 18 supplies an optical signal with a wavelength substantially the same as the transmitter laser (not shown) to the 50/50 power splitter 20. The optical signal from the receiver LO laser 18 is separated into first and second LO laser optical signals. The first LO laser optical signal is input to the second input port of the first 90 degree optical hybrid 14 and the second LO laser optical signal is input to the second input port of the second 90 degree optical hybrid 16.

The first 90 degree optical hybrid 14 is able to mix the first received and decomposed polarization component, designated as $\tilde{I}_X$ and $\tilde{Q}_X$, with the first LO laser optical signal and the first LO laser optical signal shifted by 90 degrees. The second 90 degree optical hybrid 16 is able to mix the second received and decomposed polarization component, designated as $\tilde{I}_I$ and $\tilde{Q}_Y$, with the second LO laser optical signal and the second LO laser optical signal shifted by 90 degrees. Precautions are required to ensure that the first and second LO laser optical signals have linear polarizations and the linear polarizations are matched to that of the first and second polarization components supplied to the first and second 90 optical hybrids 14, 16.

The first output of the first 90 degree optical hybrid 14 is still a purely optical signal containing signal components $(I_X,Q_X)$+LO. If LO laser optical signal power is greater than received signal power at the photodetectors 22,30,36,42, than the electrical signal after AC coupling is a mixing of an LO and a received signal. Using the first photodetector 22 as a square law mixing device it is possible to recover a first baseband electrical signal that is proportional to $I_X$. The second output of the first 90 degree optical hybrid 14 contains signal components $(I_X, Q_X)+$(90 degree shifted LO). The second photodetector 30 is used similarly to the first photodetector 22 to recover a second baseband electrical signal that is proportional to $Q_X$. The first and second AC coupling devices 23,31 are used to remove DC components that arise from the use of the first and second photodetectors 22,30 as square law mixing devices. The first and second low pass filters 24,32 serve to eliminate any high frequency components that arise from the use of the first and second photodetectors 22,30 as square law mixing devices and also serve as anti-aliasing filters before the ADCs 26,34. The first and second ADCs 26,34 allow first and second baseband electrical signals to be sampled and converted from analog signals to digital signals, which is easier to use for digital signal processing purposes. The sampling rate of the ADCs 26,34 can be either T-spaced or fractionally T-spaced.

The first and second outputs from the second 90 degree optical hybrid 16 are operated upon in a similar manner to produce third and fourth baseband electrical signals that are proportional to $I_Y$ and $Q_Y$ at the outputs of the third and fourth photodetectors 36,42. The third and fourth baseband electrical signals which are proportional to $I^Y$ and $Q_Y$ have DC components removed using the third and forth AC coupling devices 37,43, are filtered with the third and fourth low pass filters 38,44 and are sampled and converted from analog to digital signals with the third and fourth ADCs 40,46. The outputs of the four ADCs 26,34,40,46 are supplied to the digital signal processing block 28.

The polarization beamsplitter 12 and the 50/50 power splitter 20 are of any common type available that are capable of performing the tasks of decomposing light into two constituent polarization components and dividing an optical power of a light source into two substantially equal optical powers, respectively.

The photodetectors 22,30,36,42 should have enough bandwidth to encompass the spectral content of the signal. The photodetectors 22,30,36,42 are typically PIN photodiodes. More generally, the photodetectors can be any type of optical device that can detect light and convert it into an electrical signal.

An alternative embodiment to using four separate photodetectors 22,30,36,42, as shown in FIG. 1, is to use balanced photodetectors.

The AC coupling devices 23,31,37,43 are typically capacitors.

Four signal paths that exist between the polarization beamsplitter 12 and the first 90 degree optical hybrid, the polarization beamsplitter 12 and the second 90 degree optical hybrid, the 50/50 power splitter 20 and the first 90 degree optical hybrid 14 and the 50/50 power splitter 20 and the second 90 degree optical hybrid 14 must all be calibrated to within +/−5 picoseconds (ps) of each other.

Signal paths that exist between the first and second output ports of the first 90 degree optical hybrid and the digital signal block 28 and the first and second output ports of the second 90 degree optical hybrid and the digital signal block 28 must all be calibrated to within +/−5 ps of each other.

The sampling of the ADCs 26,34,40,46 can be either T-spaced or fractionally T-spaced. Sampling clocks of the ADCs 26,34,40,46 should be synchronized.

The receiver LO laser 18 and the transmitter laser must have low linewidths, for example 2 to 3 MHz. The receiver LO laser 18 must also have low relative intensity noise (RIN), for example approximately −14 dBC/Hz or better. The receiver LO laser 18 and the transmitter laser must be frequency stable. A suitable laser source for use as the receiver LO laser 18 or the transmitter laser is a standard OC-192 distributed feedback (DFB) laser.

The 90 degree optical hybrids 14,16 can be of the type described in U.S. patent application Ser. No. 10/185,136 entitled "3 Fibre I and Q Coupler" filed on Jun. 28, 2002 and incorporated herein by reference.

An ideal 90 degree optical hybrid is capable of combining an input optical signal comprising in-phase and quadrature signals with a LO laser optical signal and the LO laser optical signal phase shifted by 90 degrees without introducing errors in first and second demodulated baseband signals after mixing is performed by photodetectors. However, practical implementation of the 90 degree optical hybrid does introduce errors in the first and second demodulated baseband signals. The errors to the first and second demodulated baseband signals are caused by gain imbalance, differential delay, and quadrature angle error. Quadrature angle error is a phase angle error occurring when a 90 degree phase angle between the in-phase and quadrature signals deviates from 90 degrees. For example, if the phase angle between the in-phase and quadrature signals is actually 80 degrees, the in-phase and quadrature signals are not independent of each other. This type of orthogonal signal interference results in the fact that the in-phase and quadrature signals cannot be accurately reproduced as first and second demodulated baseband signals.

It is possible to manufacture the 90 degree optical hybrid that results in a small quadrature angle error; however the smaller the quadrature angle error the more expensive the 90 degree optical hybrid is to manufacture.

It is easy to correct for a known quadrature angle error by digital signal processing means. Therefore, it is more cost effective to perform compensation on first and second baseband electrical signals of the first polarization component and third and fourth baseband electrical signals of the second polarization component using the digital signal processing block 28.

A known quadrature angle error can be corrected with only minor error occurring in the first, second, third, and fourth baseband electrical signals if the thermal and shot noise of the photodetectors 22,30,36,42 used in the coherent receiver 10 and other sources of electrical noise which occur between the first and second 90 degree optical hybrids 14,16 and the digital signal processing block 28 are negligible contributions to overall noise power of the first, second, third, and fourth baseband electrical signals. A prime difficulty of correcting the quadrature angle error between the in-phase and quadrature signals of the first polarization component and the in-phase and quadrature signals of the second polarization component is first accurately determining the quadrature angle error caused by the first and second 90 degree optical hybrids 14,16.

There currently is no conventional method for estimating the quadrature angle error between in-phase and quadrature signals. The present practice for determining the quadrature angle error is to rely on calibration data of the 90 degree optical hybrid. However, errors introduced during calibration, such as thermal drift of the 90 degree optical hybrid, may lead to incorrectly identifying the quadrature angle error of a 90 degree optical hybrid. Correcting the quadrature angle error is only effective if an estimate of the quadrature angle error is substantially correct.

The following table indicates an optical signal to noise ratio (OSNR) penalty incurred to maintain a particular bit error rate (BER) as the quadrature angle error increases. As the quadrature angle error increases the OSNR penalty increases as well. A higher OSNR penalty means more degradation due to quadrature angle error. Therefore, a transmitted signal has a shorter transmission distance before signal regeneration is required. For example, an OSNR of 3 dB would reduce transmission distance by one half, if no Kerr non-linearity is considered.

An example communication system used to generate the data consists of a back to back dual-polarization QPSK transmitter-receiver simulation where both the transmitter laser and receiver LO have 2 MHz linewidths.

| Quadrature angle Error (degrees) | OSNR Penalty (dB) |
| --- | --- |
| 0 | |
| 5 | 0.04 |
| 10 | 0.26 |
| 15 | 0.41 |
| 20 | 0.61 |

Figure 2:
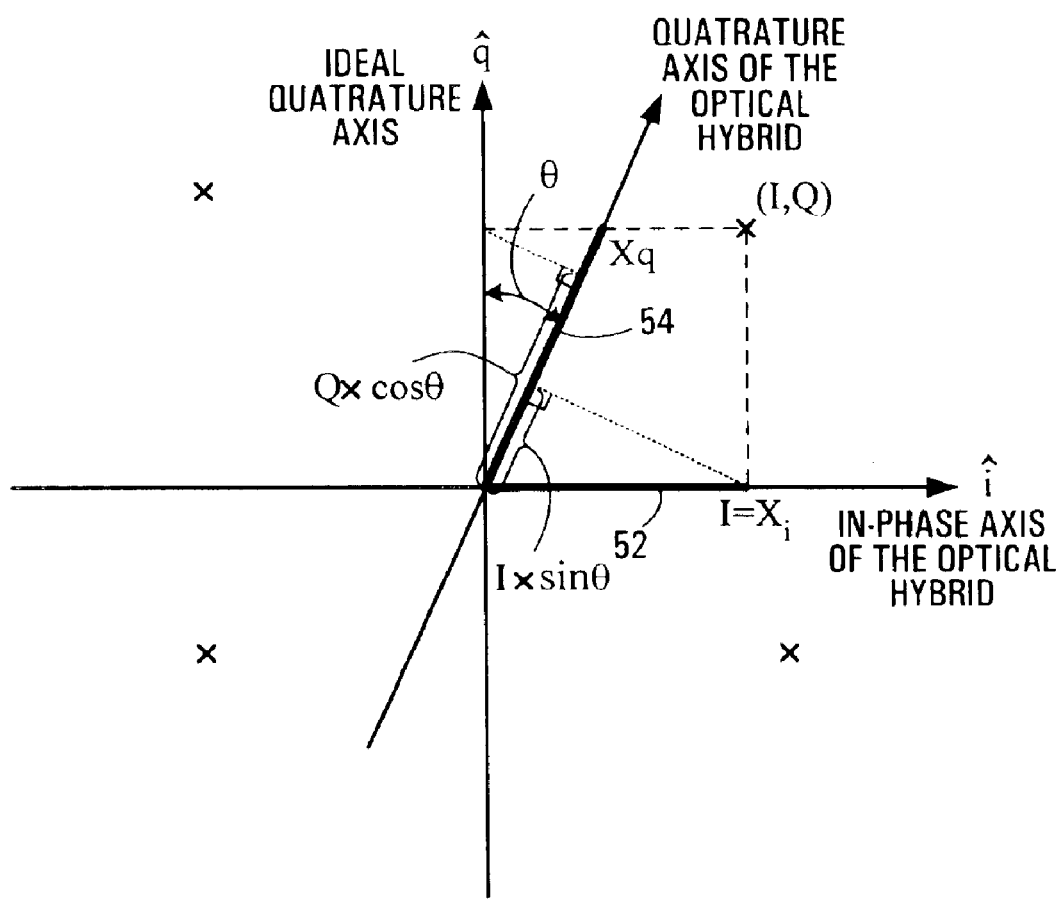
FIG. 2 is a two-dimensional representation of two detected signals which are output from a 90 degree optical hybrid.

FIG. 2 is a representation of detected in-phase and detected quadrature signals 52,54 output from an 90 degree optical hybrid displayed on a conventional X-Y axis. The X-axis is an in-phase axis of the 90 degree optical hybrid and is labelled as $\hat{i}$. The Y-axis is an ideal quadrature axis of the 90 degree optical hybrid and is labelled as $\hat{q}$. The detected in-phase signal $X_i$ 52 exists directly on the in-phase axis of the 90 degree optical hybrid. The detected quadrature signal $X_q$ 54 exists $\theta$ degrees off of the ideal quadrature axis, on the quadrature axis of the 90 optical hybrid, where the angle $\theta$ is the quadrature angle error.

To properly correct the quadrature angle error $\theta$ between the detected in-phase and quadrature signals 52,54 requires several steps. An initial step involves generating an estimate of the quadrature angle error $\theta$. A further step involves compensating for the quadrature angle error $\theta$ by making use of the estimate found in the initial step.

Before proceeding further, it is useful to clarify and simplify the notation being used to describe embodiments of the invention. Generating the estimate and compensating for the quadrature angle error must be performed for both polarization components. However, the procedure is similar in both cases. Thus, the following description will only examine the procedure for a single polarization component, say x-polarization. The signals prior to entering the 90 degree optical hybrid are represented as $I_x(t)$ and $Q_x(t)$, for simplicity I(t) and Q(t), and the detected signals following the 90 degree optical hybrid, photodetectors, and gain correction block (not shown in detail) are represented by $X_i(t)$ and $X_q(t)$, or simply $X_i$ and $X_q$.

Referring to FIG. 2, the detected in-phase signal $X_i$ 52 is represented as simply I(t) as it exists solely on the in-phase axis. The detected quadrature signal $X_q$ 54 does not exist solely on the ideal quadrature axis, but can be described as a function of signals existing on both the in-phase and ideal quadrature axes and the quadrature angle error $\theta$. The detected in-phase and quadrature signals 52,54 are expressed in matrix form as shown in Equation 1.

$$\begin{bmatrix} X_i \\ X_q \end{bmatrix} = \begin{bmatrix} I(t) \\ \sin(\theta)I(t) + \cos(\theta)Q(t) \end{bmatrix} = \begin{bmatrix} 1 & 0 \\ \sin(\theta) & \cos(\theta) \end{bmatrix} \begin{bmatrix} I(t) \\ Q(t) \end{bmatrix} \quad \text{Equation 1}$$

An estimate of the quadrature angle error can be calculated by performing the time-averaged multiplication of the detected in-phase and quadrature signals 52,54 as represented in Equation 1. The time-averaged multiplication of the detected in-phase and quadrature signals 52,54 essentially amounts to a correlation function. Multiplying I(t) by I(t)sin($\theta$)+Q(t)cos($\theta$) and time-averaging results in a function that is equal to $I^2(t)\sin(\theta)$. The I(t)*Q(t)cos($\theta$) term time-averages to zero as I(t) and Q(t) are uncorrelated. Therefore, the time-averaged multiplication of the detected in-phase and quadrature signals 52,54 can be expressed as shown in Equation 2.

$$\overline{X_i \times X_q} = \overline{X_i^2} \sin(\theta)$$

or $$\overline{I(t) \times [\sin(\theta)I(t) + \cos(\theta)Q(t)]} = \overline{I^2(t)}\sin(\theta) \quad \text{Equation 2}$$

Normalization of Equation 2 with respect to $\overline{I^2(t)}$ isolates the sin($\theta$) term.

$$\frac{\overline{X_i \times X_q}}{\overline{X_i^2}} = \sin(\theta) \quad \text{or} \quad \text{Equation 3}$$

$$\frac{\overline{I(t) \times [\sin(\theta)I(t) + \cos(\theta)Q(t)]}}{\overline{I^2(t)}} = \sin(\theta)$$

The further step of correcting the quadrature angle error involves cross-multiplying the detected in-phase and quadrature signals 52,54 by coefficients that compensate for the quadrature angle error. The coefficients are a function of the estimate of the quadrature angle error. A matrix of coefficients of the form $$\begin{bmatrix} 1 & 0 \\ \frac{-\sin(\theta)}{\cos(\theta)} & \frac{1}{\cos(\theta)} \end{bmatrix}$$

will compensate for the quadrature angle error.

Multiplying the matrix of coefficients by the matrix representation of the detected in-phase and quadrature signals shown in Equation 1 results in Equation 4, where it is seen that the detected in-phase and quadrature signals 52,54 are now uncorrelated and independent of each other.

$$\begin{bmatrix} X'_i \\ X'_q \end{bmatrix} = \begin{bmatrix} 1 & 0 \\ \frac{-\sin(\theta)}{\cos(\theta)} & \frac{1}{\cos(\theta)} \end{bmatrix} \begin{bmatrix} X_i \\ X_q \end{bmatrix} \text{ or}$$

Equation 4

$$\begin{bmatrix} I(t) \\ Q(t) \end{bmatrix} = \begin{bmatrix} 1 & 0 \\ \frac{-\sin(\theta)}{\cos(\theta)} & \frac{1}{\cos(\theta)} \end{bmatrix} \begin{bmatrix} 1 & 0 \\ \sin(\theta) & \cos(\theta) \end{bmatrix} \begin{bmatrix} I(t) \\ Q(t) \end{bmatrix}$$

It is important that no noise or distortion is introduced during the process of multiplication of the matrix of coefficients and the detected in-phase and quadrature signals 52,54 as this reduces the effectiveness of correcting for the quadrature angle error.

Matrix multiplication is ideally suited to digital signal processing techniques. A method for correcting quadrature angle error can be easily implemented on the baseband electrical signals that are digitally sampled by the four ADCs 26,34,40,46 in FIG. 1. The method is performed for the detected in-phase and quadrature signals of the first polarization component and for the detected in-phase and quadrature signals of the second polarization component within the digital signal processing block 28.

From Equation 4 it is known that the detected in-phase signal is multiplied by 1 and the detected quadrature signal is multiplied by coefficients which are a function of an estimate of the quadrature angle error. The corrected form of the detected quadrature signal is $$X'_q = \frac{-\sin\theta}{\cos\theta} X_i + \frac{1}{\cos\theta} X_q$$

or $$X'_q = \frac{1}{\cos\theta}(X_q - \sin\theta X_i).$$

From Equation 2 it is known that $$\sin\theta = \frac{\overline{X_i \times X_4}}{\overline{X_i^2}} \text{ or } \sin\theta = \frac{B}{A},$$

where $A = \overline{X_i^2}$ and $B = \overline{X_i \times X_q}$. Trigonometric identities provide $$\cos\theta = \frac{1}{\overline{X_i^2}} \sqrt{\overline{X_i^2}^2 - \overline{X_i \times X_q}^2}$$

or $$\cos\theta = \frac{1}{A}\sqrt{A^2 - B^2}.$$

Therefore to solve for $X_q$ it is necessary to multiply $X_q$ by $$\frac{A}{\sqrt{A^2 - B^2}} \text{ and } X_i \text{ by } \frac{-B}{\sqrt{A^2 - B^2}}.$$

Figure 3:
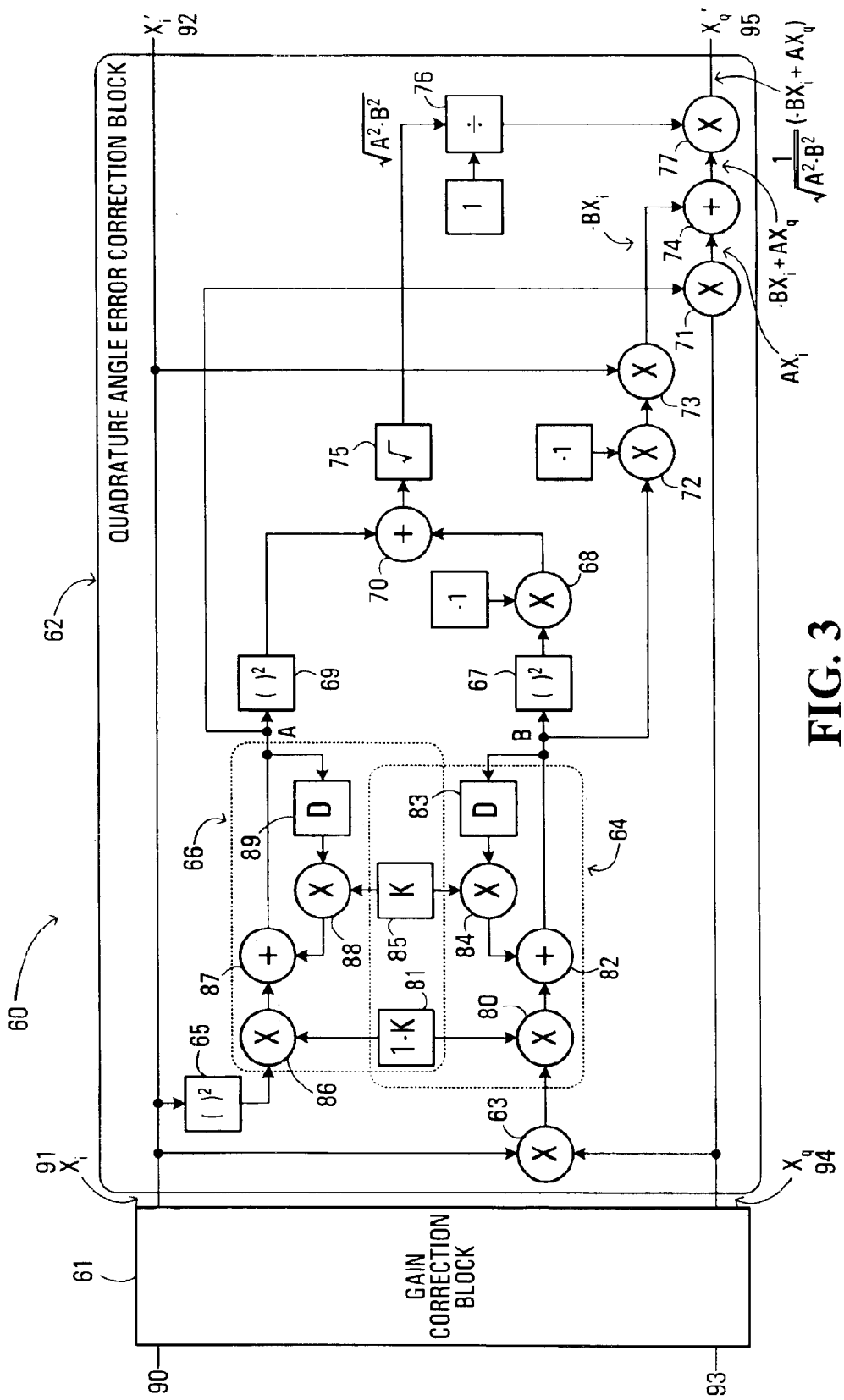
FIG. 3 is a schematic of a digital signal processing implementation of a quadrature angle error correction method provided by an embodiment of the invention.

FIG. 3 is an example embodiment of a digital signal processing implementation 60 for correcting the quadrature angle error between the detected in-phase and quadrature signals of the first polarization component. The digital signal processing block 28 of FIG. 1 performs the digital signal processing required by the digital signal processing implementation 60. The detected in-phase and quadrature signals supplied from the ADCs are used to generate the quadrature angle error estimate. The quadrature angle error estimate is then used to create the coefficients that are multiplied by the detected in-phase and quadrature signals to create the corrected versions of the detected in-phase and quadrature signals.

The digital signal processing implementation 60 comprises a gain correction block 61 and a quadrature angle error correction block 62 connected in series. The gain correction block 61 has first and second inputs 90,93 and first and second outputs 91,94. The first and second outputs 91,94 from the gain correction block 61 are the first and second inputs 91,94 to the quadrature angle error correction block 62. The quadrature angle error correction block 62 has first and second outputs 92,95.

Within the quadrature angle error correction block 62 there are a series of functions used to correct the detected in-phase and quadrature signals. The first input 91 of the quadrature angle error correction block 62 and the second input 94 of the quadrature angle error correction block 62 are each supplied to a first multiplier 63. An output from the first multiplier 63 is supplied to a first time-averaging function 64. An output from the first time-averaging function 64 is supplied to a second squaring function 67 and an output from the second squaring function 67 is supplied to a second multiplier 68. A value of negative 1 is also supplied to the second multiplier 68. An output from the second multiplier 68 is supplied to a first summer 70. The first input 91 of the quadrature angle error correction block 62 is also supplied to a first squaring function 65 and an output from the first squaring function 65 is passed to a second time-averaging function 66. An output from the second time-averaging function 66 is supplied to a third squaring function 69 and an output from the third squaring function 69 is supplied to the first summer 70.

An output from the second time-averaging function 66 is supplied to a third multiplier 71. The second input 44 to the quadrature angle error correction block 62 is also supplied to the third multiplier 71.

The output from the first time-averaging function 64 is supplied to a fourth multiplier 72. A value of negative 1 is also supplied to the fourth multiplier 72. An output from the fourth multiplier is supplied to a fifth multiplier 73. The first input 91 of the quadrature angle error correction block 62 is also supplied to the fifth multiplier 73. An output from the fifth multiplier 73 is supplied to a second summer 74. An output from the third multiplier 71 is also supplied to the second summer 74.

An output from the first summer 70 is supplied to a square root function 75. An output from the square root function is supplied to a divider 76. A value of 1 is also supplied to the divider 76. An output from the divider 76 is supplied to a sixth multiplier 77. An output from the second summer 74 is also supplied to the sixth multiplier 77.

The first input 91 to the quadrature angle error correction block 62 is passed directly to the first output $X_i'$ 92 of the quadrature angle error correction block 62. The second output $X_q'$ 95 of the quadrature angle error correction block 62 is an output from the sixth multiplier 77.

The first time-averaging function 64 has a first input supplied by the output from the first multiplier 63. The first input of the first time-averaging function 64 is supplied to a seventh multiplier 80. A first constant 81 is also supplied to the seventh multiplier 80. An output from the seventh multiplier 80 is supplied to a third summer 82. An output from the third summer 82 is the output from the first time-averaging function 64. The output from the third summer 82 is also supplied to a first delay function 83 within the first time-averaging function 64. An output from the first delay function 83 is supplied to an eighth multiplier 84. A second constant 85 is also supplied to the eighth multiplier 84. An output from the eighth multiplier 84 is supplied to the third summer 82.

The input to the second time-averaging function 66 is supplied by the output from the first squaring function 65. The input to the second time-averaging function 66 is supplied to a ninth multiplier 86. The first constant 81 is also supplied to the ninth multiplier 86. An output from the ninth multiplier 86 is supplied to a fourth summer 87. An output from the fourth summer 87 is the output from the second time-averaging function 66. The output from the fourth summer 87 is also supplied to a second delay function 89 within the second time-averaging function 66. An output from the second delay function 89 is supplied to an tenth multiplier 88. The second constant 85 is also supplied to the tenth multiplier 88. An output from the tenth multiplier 88 is supplied to the fourth summer 87.

The first and second time-averaging functions 64,66 use the same first and second constants 81,85. A value of the second delay function 89 is the same as that of the first delay function 83.

In operation, the first input 91 to the quadrature angle error correction block 62 is represented by $X_i$. The second input 94 to the quadrature angle error correction block 62 is represented by $X_q$. The output from the first multiplier 63 is a signal that is equal to $X_i \times X_q$. The output from the first multiplier 63 is supplied to the first time-averaging function 64 which generates a time-averaged result in the form $\overline{X_i \times X_q}$, or B as identified above. The output from the first time-averaging function 64 is squared by the second squaring function 67 and then made negative by the second multiplier 68, resulting in a value that is equal to $-B^2$. The output from the first squaring function 65 is equal to $X_i^2$. The output from the first squaring function 65 is supplied to the second time-averaging function 66 which generates a time-averaged result in the form $\overline{X_i^2}$, or A as identified above. The output of the second time-averaging function 66 is squared by the third squaring function 69, resulting in a value that is equal to $A^2$. The first summer 70 adds the output from the third squaring function 69 and the output of the second multiplier 68 for a result that equals $A^2-B^2$. The output from the first summer 70 is supplied to the square root function 75. The output from the square root function 75 is of the form $\sqrt{A^2-B^2}$. The output from the square root function 75 is inverted by the divider 76.

The output from the first time-averaging function 64, which is equal to B, is multiplied by negative 1 using the fourth multiplier 72. The output from the fourth multiplier 72 is multiplied by the first input 91 to the quadrature angle error correction block 62 using the fifth multiplier 73, which gives a result that is equal to $-B \times X_i$. The output from the second time-averaging function 66, which is equal to A, is multiplied by the second input 94 of the quadrature angle error correction block 62 using the third multiplier 71 which gives a result of $A \times X_q$. The output from the fifth multiplier 73 and the third multiplier 71 are added at the second summer 74 resulting in $A \times X_q - B \times X_i$.

The output from the divider 76 and the output from the second summer 74 are multiplied together using the sixth multiplier 77. The output from the sixth multiplier is $$\frac{A}{\sqrt{A^2-B^2}} \times X_q - \frac{B}{\sqrt{A^2-B^2}} \times X_i.$$

This is the same result as the corrected form of the quadrature signal $X_q'$ described above. The first output 92 of the quadrature angle error correction block 62 is equal to the first input of the quadrature angle error correction block 62 and the second output 95 of the quadrature angle error correction block 62 is the output from the sixth multiplier 77.

The first and second constants 81,85 used in the first and second time-averaging blocks 64,66 are chosen so as to optimize the time-averaging process.

The first and second delay functions 83,89 of the first and second time-averaging blocks 64,66 are typically chosen to be a single sample period delay, however more generally it can be chosen to be any desired value.

The third multiplier 71, the fifth multiplier 73, the sixth multiplier 77 and the second summer 74 must all operate in real-time synchronized with the bit rate of the transmitted signal. The first multiplier 63, the second multiplier 68, the fourth multiplier 72, the seventh multiplier 80, the eighth multiplier 84, the ninth multiplier 86, the tenth multiplier 88, the first summer 70, the third summer 82, the fourth summer 87, the divider 76, the first squaring function 65, the second squaring function 67, the third squaring function 69, and the square root function 75 can all operate at slower operating speeds than real-time.

In some embodiments of the invention the digital signal processing block 28 can be a processing element such as an application-specific integrated circuit (ASIC). In other embodiments the digital signal processing block 28 can be a computer useable medium that can store and process computer readable program code.

In some embodiments, the digital signal processing block 28 is hardwired with computer readable program code means for correcting the quadrature angle error. In other embodiments, the digital signal processing block 28 is programmable and computer readable program code means can be loaded into the digital signal processing block 28 for correcting the quadrature angle error.

In some embodiments, the digital signal processing block 28 can also be used to compensate for gain imbalance errors in the in-phase and quadrature signals of the first polarization component and the in-phase and quadrature signals of the second polarization component at the same time as correcting the quadrature angle errors of the first polarization component and the second polarization component. As mentioned previously, the gain imbalance errors occur as a result of the 90 degree optical hybrid used in the coherent receiver.

In an alternative embodiment instead of using the digital signal processing block, an analog signal processing block is implemented where the quadrature angle error correction is performed with analog signal processing elements.

In another embodiment of the example implementation of FIG. 3, some functions can be replaced with the use of a look-up table. In particular, all functions used along signal paths that follow the second squaring function 67 and the third squaring function 69 which are combined by the first summer 70, a combined result which is square rooted by the square root function 75 and inverted by the divider 76 can be replaced by using the look-up table. The outputs from the first and second time-averaging functions 64,66 can be supplied to the look-up table. The look-up table would supply a pre-calculated result to the sixth multiplier without the need for various calculation functions described above.

The method of correcting the quadrature angle error allows a dual-polarization optical transport system to be robust to large amounts of potentially time-varying I-Q quadrature offset.

The method of correcting the quadrature angle error is robust to severe channel distortion encountered within the optical fiber such as polarization mode dispersion (PMD), polarization dependent loss (PDL), Kerr non-linearity, or chromatic dispersion.

The method is also robust to temperature effects and ageing of the 90 degree optical hybrid that may introduce a larger or smaller quadrature angle error to the in-phase and quadrature signals over lifetime of the 90 degree optical hybrid.

It is important to note that phase noise of the transmission laser and the receiver LO laser do not affect the estimate of the quadrature angle error. Polarization rotation of the transmitted signal when travelling in the fiber also does not affect the estimate of the quadrature angle error.

In a particular embodiment of the invention, the correction of the quadrature angle error is used with a dual-polarization QPSK Optical Transport System. More generally, the correction method can be used for various modulation schemes, such as binary PSK, M-ary PSK where M>4 or Quadrature Amplitude Modulation (QAM).

Numerous modifications and variations of the present invention are possible in light of the above teachings. It is therefore to be understood that within the scope of the appended claims, the invention may be practised otherwise than as specifically described herein.

What is claimed is:

1. A method for correcting in an optical coherent receiver a quadrature angle error ($\theta$), wherein a first detected signal is a detected in-phase signal represented in a form I(t) and a second detected signal is desired to be in quadrature with respect to the first detected signal but is offset from being in quadrature by the quadrature angle error, the second detected signal represented in a form $I(t)\sin(\theta)+Q(t)\cos(\theta)$, the method comprising generating an estimate of the quadrature angle error by multiplying the first detected signal and the second detected signal together to generate a product that is proportional to the quadrature angle error; and compensating for the quadrature angle error by multiplying the first detected signal and the second detected signal by coefficients which are a function of the estimate of the quadrature angle error that substantially cancel the quadrature angle error.

2. A method for correcting in an optical coherent receiver the quadrature angle error according to claim 1, wherein generating an estimate of the quadrature angle error further comprises;

i) multiplying the first detected signal and the second detected signal together to generate a function that is proportional to the quadrature angle error in the form $$\overline{I(t) \times [\sin(\theta)I(t) + \cos(\theta)Q(t)]} = \overline{I^2(t)}\sin(\theta)$$

and ii) normalizing the result of step I) with respect to $\overline{I^2}(t)$ resulting in $$\frac{\overline{I(t) \times [\sin(\theta)I(t) + \cos(\theta)Q(t)]}}{\overline{I^2(t)}} = \sin(\theta).$$

3. A method for correcting in an optical coherent receiver the quadrature angle error according to claim 1, wherein compensating for the quadrature angle error further comprises;

i) creating a matrix of coefficients which are a function of an estimate of the quadrature angle error of the form $$\begin{bmatrix} 1 & 0 \\ \frac{-\sin(\theta)}{\cos(\theta)} & \frac{1}{\cos(\theta)} \end{bmatrix}$$

and ii) multiplying the first detected signal and the second detected signal by the matrix of coefficients.

4. A method for correcting in an optical coherent receiver the quadrature angle error according to claim 2, wherein compensating for the quadrature angle error further comprises;

i) creating a matrix of coefficients which are a function of an estimate of the quadrature angle error of the form $$\begin{bmatrix} 1 & 0 \\ \frac{-\sin(\theta)}{\cos(\theta)} & \frac{1}{\cos(\theta)} \end{bmatrix}$$

and ii) multiplying the first detected signal and the second detected signal by the matrix of coefficients.

5. A computer useable medium having computer readable program code means embodied therein for correcting in an optical coherent receiver a quadrature angle error ($\theta$). wherein a first detected signal is a detected in-phase signal represented in a form I(t) and the second detected signal is desired to be in quadrature with respect to the first detected signal but is offset from being in quadrature by the quadrature angle error the second detected signal represented in a form $I(f)\sin(\theta)+Q(t)\cos(\theta)$, the computer readable program code means comprising;

code means for generating an estimate of the quadrature angle error by multiplying the first detected signal and the second detected signal together to generate a product that is proportional to the quadrature angle error, and code means for compensating for the quadrature angle error by multiplying the first detected signal and the second detected signal by coefficients which are a function of the estimate of the quadrature angle error that substantially cancel the quadrature angle error.

6. A computer useable medium having computer readable program code means embodied therein for correcting in an optical coherent receiver the quadrature angle error according to claim 5, wherein the code means for generating an estimate of the quadrature angle error further comprises;

i) code means for multiplying the first detected signal end the second detected signal together to generate a function that is proportional to the phase error in the form $$\overline{I(t) \times [\sin(\theta)I(t) + \cos(\theta)Q(t)]} = \overline{I^2(t)}\sin(\theta)$$

and ii) code means for normalizing the result of step i) with respect to $\overline{I^2(t)}$ resulting in $$\frac{\overline{I(t) \times [\sin(\theta)I(t) + \cos(\theta)Q(t)]}}{\overline{I^2(t)}} = \sin(\theta).$$

7. A computer useable medium having computer readable program code means embodied therein for correcting in an optical coherent receiver the quadrature angle error according to claim 5, wherein the code means for compensating for the quadrature angle error further comprises;

i) code means for creating a matrix of coefficients which are a function of an estimate of the quadrature angle error of the form $$\begin{bmatrix} 1 & 0 \\ \frac{-\sin(\theta)}{\cos(\theta)} & \frac{1}{\cos(\theta)} \end{bmatrix}$$

and ii) code means for multiplying the first detected signal and the second detected signal by the matrix of coefficients.

8. A computer useable medium having computer readable program code means embodied therein for correcting in an optical coherent receiver the quadrature angle error according to claim 6, wherein the code means for compensating for the quadrature angle error further comprises:

i) code means for creating a matrix of coefficients which are a function of an estimate of the quadrature angle error of the form $$\begin{bmatrix} 1 & 0 \\ \frac{-\sin(\theta)}{\cos(\theta)} & \frac{1}{\cos(\theta)} \end{bmatrix}$$

and ii) code means for multiplying the first detected signal and the second detected signal by the matrix of coefficients.

9. A processing element for correcting in an optical coherent receiver a quadrature angle error ($\theta$), wherein a first detected signal is a detected in-phase signal represented in a form I(t) and the second detected signal is desired to be in quadrature with respect to the first detected signal but is offset from being in quadrature by the quadrature angle error, the second detected signal represented in a form I(t)sin($\theta$)+Q(t)cos($\theta$), the processing element comprising processing means for generating an estimate of the quadrature angle error by multiplying the first detected signal and the second detected signal together to generate a product that is proportional to the quadrature angle error, and processing means for compensating for the quadrature angle error by multiplying the first detected signal and the second detected signal by coefficients which are a function of the estimate of the quadrature angle error that substantially cancel the quadrature angle error.

10. A processing element for correcting in an optical coherent receiver the quadrature angle error according to claim 9, wherein the processing means for generating an estimate of the quadrature angle error further comprises;

i) processing means for multiplying the first detected signal and the second detected signal together to generate a function that is proportional to the phase error in the form $$\overline{I(t) \times [\sin(\theta)I(t) + \cos(\theta)Q(t)]} = \overline{I^2(t)}\sin(\theta)$$

and ii) processing means for normalizing the result of step i) with respect to $\overline{I^2(t)}$ resulting in.

$$\frac{\overline{I(t) \times [\sin(\theta)I(t) + \cos(\theta)Q(t)]}}{\overline{I^2(t)}} = \sin(\theta).$$

11. A processing element for correcting in an optical coherent receiver the quadrature angle error according to claim 9, wherein the processing means for compensating for the quadrature angle error further comprises;

i) processing means for creating a matrix of coefficients which are a function of an estimate of the quadrature angle error of the form $$\begin{bmatrix} 1 & 0 \\ \frac{-\sin(\theta)}{\cos(\theta)} & \frac{1}{\cos(\theta)} \end{bmatrix},$$

and ii) processing means for multiplying the first detected signal and the second detected signal by the matrix of coefficients.

12. A processing element for correcting in an optical coherent receiver the quadrature angle error according to claim 10, wherein the processing means for compensating for the quadrature angle error further comprises;

i) processing means for creating a matrix of coefficients which are a function of an estimate of the quadrature angle error of the form $$\begin{bmatrix} 1 & 0 \\ \frac{-\sin(\theta)}{\cos(\theta)} & \frac{1}{\cos(\theta)} \end{bmatrix},$$

and ii) processing means for multiplying the first detected signal and the second detected signal by the matrix of coefficients.

13. A processing element according to claim 9, wherein the processing element is used to correct quadrature angle errors that exist between the first and second detected signals of a first polarization component and between first and second detected signals of a second polarization component at a receiver end of a dual-polarization optical transport system comprising a transmitter, fiber transmission channel, and the optical coherent receiver, wherein the optical coherent receiver comprises a local oscillator laser, first and second 90 degree optical hybrids, photodetection means, AC coupling means, analog to digital converter means, and the processing element and wherein the first and second detected signals of the first polarization component are comprised of first and second electrical baseband signals and the first and second detected signals of the second polarization component are comprised of third and fourth electrical baseband signals.

14. A processing element according to claim 13, wherein the processing element for correcting the quadrature angle error is used for compensating gain imbalance error occurring within the first and second electrical baseband signals and for compensating gain imbalance error occurring within the third and fourth electrical baseband signals of the second polarization component.

15. A processing element according to claim 9, wherein the processing element is an application-specific integrated circuit (ASIC).

16. A professing element according to claim 13, wherein the processing element is an ASIC.

17. A method for correcting the quadrature angle error according to claim 1, wherein a modulation scheme used to modulate a transmitted signal received by the optical coherent receiver is binary phase shift keying (PSK), quadriphase-shift keying (QPSK), M-ary PSK where M>4, or Quadrature Amplitude Modulation (QAM).

18. A computer useable medium having computer readable program code means embodied therein for correcting the quadrature angle error according to claim 5, wherein a modulation scheme used to modulate a transmitted signal received by the optical coherent receiver is binary PSK, QPSK, M-ary PSK where M>4, or QAM.

19. A processing element for correcting the quadrature angle error according to claim 9, wherein a modulation scheme used to modulate a transmitted signal received by the optical coherent receiver is binary PSK, QPSK, M-ary PSK where M>4, or QAM.

20. A processing element for correcting the quadrature angle error according to claim 9, wherein the optical coherent receiver includes a local oscillator laser, first and second 90 degree optical hybrids, photodetection means, AC coupling means and analog to digital converter means, and digital signal processing means;

wherein the digital signal processing means includes the processing element and the processing element corrects quadrature angle errors that occur within the first and second 90 degree optical hybrids resulting in detected signals of a first polarization component and detected signals of a second polarization component, and wherein the detected signals of the first polarization component are comprised of first and second electrical baseband signals and the detected signals of the second polarization component are comprised of third and fourth electrical baseband signals.

21. A processing element for correcting the quadrature angle error according to claim 9, wherein the processing element resides in a dual-polarization optical transport system comprising a transmitter, fiber transmission channel, and the optical coherent receiver;

wherein the optical coherent receiver comprises a local oscillator laser, first and second 90 degree optical hybrids, photodetection means, AC coupling means and analog to digital converter means, and digital signal processing means;

wherein the digital signal processing means includes the processing element and the processing element corrects quadrature angle errors that occur within the first and second 90 degree optical hybrids resulting in detected signals of a first polarization component and detected signals of a second polarization component, and wherein the detected signals of the first polarization component are comprised of first and second electrical baseband signals and the detected signals of the second polarization component are comprised of third and fourth electrical baseband signals.

* * * * *

UNITED STATES PATENT AND TRADEMARK OFFICE
CERTIFICATE OF CORRECTION

PATENT NO. : 6,917,031 B1
DATED : July 12, 2005
INVENTOR(S) : Han Sun and Kuang Tsan Wu It is certified that error appears in the above-identified patent and that said Letters Patent is hereby corrected as shown below:

Column 14,
Line 15, delete "($^2$t)" and insert -- $I^2(t)$ --;
Line 54, delete extraneous period;
Line 61, delete "I(f) sin(θ)" and insert -- I(t) sin(θ) --;

Column 15,
Line 15, delete "J(t)x[sin(θ)I(t)+cos(θ)Q(t)]" and insert -- I(t)x[sin(θ)I(t)+cos(θ)Q(t)] --;

Column 16,
Line 24, delete extaneous period.

Signed and Sealed this

Third Day of January, 2006

JON W. DUDAS
*Director of the United States Patent and Trademark Office*